United States Patent Office 3,244,689
Patented Apr. 5, 1966

3,244,689
FINING GELATIN SOLUTIONS WITH BASIC
ALUMINUM HYDRATE
Robert B. Huntoon, Rowley, George A. Consolazio, Burlington, Anastasios J. Paraskevas, Stoneham, Nicholas J. Kalafatas, Arlington, and Ronald E. Moses, East Boston, Mass., assignors to General Foods Corporation, White Plains, N.Y., a corporation of Delaware
No Drawing. Filed Jan. 11, 1961, Ser. No. 111,880
4 Claims. (Cl. 260—118)

This invention relates to the treating of gelatin. More specifically, it relates to a method of fining gelatin to remove impurities therefrom and to improve the clarity and other properties thereof.

As is well known, many proteins, typified by gelatin, are recovered from raw materials which contain a high percentage of impurities. Gelatin, for example, may be recovered from several sources, typical of which are ossein, pigskins, and lime splits. During the processing operations which are required to recover gelatin from these or other sources, the raw material may be contacted with a variety of reagents among which, depending upon the particular raw material and process, are lime, magnesium oxide, caustic soda, and various other materials. Furthermore, during the various handling or treating operations, gelatin solutions may come into contact with various materials, including metal surfaces of equipment, etc., from which the solution may pick up varying amounts of impurities.

As a result, extracted gelatin will generally contain varying amounts of a wide variety of impurities, most typical of which are metallic impurities, e.g., heavy metals. The metals which have been found in gelatin at various times include calcium, barium, strontium, magnesium, beryllium, radium, lithium, iron, silver, lead, tin, chromium, mercury, copper, zinc, cadmium, titanium, uranium, gold, platinum and bismuth. The concentration in which these metals is found ranges from the lower limit of measurability for, e.g., radium, uranium and gold, to quantities in the low percentage range, e.g., 2% to 4% for calcium, under certain undesirable conditions. It is possible to control the amount of some of these metals in the final gelatin product by modifying or controlling the processing steps; in some instances, the quantity of impurities may be decreased to some extent by washing or other treatment of either the raw material stock or the final dry gelatin product.

It will be apparent to those skilled in the art that each of these impurities, typified by heavy metals, may be considered undesirable for various reasons and at various levels. In all cases, presence of these materials increases the ash content. Since ash content is generally regarded as being one of the criteria for determining quality of gelatin, it will be apparent that if the total content of these metals (in the form of their ash which may typically be measured as the oxide) is greater than about 2.0%, the gelatin may be considered undesirable for certain uses, e.g., gelatin desserts.

Presence in gelatin of some of these impurities, typified by calcium, imparts to the product gelatin a very low clarity, i.e., a high degree of turbidity. This may be undesirable when the gelatin is used in numerous ways including, for example, gelatin desserts or in photographic emulsions.

Certain of these metal impurities, e.g., copper, may be toxic, and for this reason it may be necessary to minimize the concentration of this metal. Still others of the metals, typified by magnesium, may react with components found in water to form precipitates which may interfere with the various reactions in which the gelatin may be participating or which occur in the presence of the gelatin.

Furthermore, certain of these impurities, typified by mercury or copper, are sufficiently active photographically to interfere with the properties of photographic emulsions which are prepared from gelatin. More specifically, presence of such materials may be sufficient to render the gelatin photographically active rather than inert as is desired in certain photographic uses.

Attempts which have heretofore been made to purify gelatin with respect to these impurities have been less than fully successful. Prior art techniques have been undesirably characterized by requiring undesirable chemical reactions to occur in the presence of the gelatin solution; these reactions and/or treatments have typically been very slow in effecting the desired results. Furthermore, in many of the attempts it has been necessary to employ undesirably high temperatures for long periods of time. When washing has been employed at ambient temperatures, it has been found that the required period of time for the substantial removal of impurities is inordinately long.

Under certain other conditions attempts have been made to purify the gelatin at very low or at very high pH. Such attempts, as well as other approaches which have required unusual conditions, including high temperature, lengthy treatment time, and the use of special reagents, have been uniformly unsatisfactory in that they undesirably modify the physical properties of the gelatin. Treatment under the best prior art conditions will commonly lower the bloom and/or the viscosity of gelatin, and most commonly these treatments are such that there is a considerable loss of otherwise recoverable protein.

It is an object of this invention to set forth a novel technique for treating gelatin to remove substantial quantities of impurities therefrom. It is a more specific object of this invention to achieve production of a purified gelatin containing metallic impurities at a very low level. Other objects will be apparent to those skilled in the art on examination of the following description.

The process which is referred to herein as "fining," is defined generally as one in which a solution of gelatin, for example, is improved by the precipitation therein of a flocculent mass. As the flocculent mass precipitates through the solution, it removes impurities, improves color characteristics and reduces opacity. This improvement and clarification may be accomplished by any one or a combination of several phenomena, such as occlusion, coprecipitation, adsorption, etc., all of which will be included herein in the general category of fining.

In accordance with certain of its aspects, the process of this invention for fining a gelatin solution containing minor amounts of organic and metallic impurities includes the step of adding to the gelatin solution a soluble aluminum salt, e.g., $Al_2(SO_4)_3$. It has been found preferable when a soluble aluminum salt is added to the gelatin solution as a fining agent, that the salt be added in an alkaline solution thereof. Such addition is necessary in order that concentrated base not be added directly to the gelatin-aluminum salt solution, since gelatin has a marked tendency to hydrolyze if subjected to alkaline conditions in excess of about pH 8.5.

A further feature of the present invention is the fining of gelatin solutions by the addition thereto of a soluble carbonate as well as a soluble aluminum salt. Since certain metallic impurities do not form insoluble hydroxides or hydrates under alkaline conditions but do form insoluble carbonates, the addition of a soluble carbonate salt can bring down these further impurities.

Certain types of gelatins, particularly those which are recovered from porkskins, contain relatively large amounts of fatty emulsions, which are not carried down in desirable quantities either by an aluminum hydrate or a carbonate. It has been found that the addition of a soluble phosphate to such a gelatin solution, preferably accompanied by a soluble aluminum salt and a soluble carbonate, is highly effective in removing these fatty emulsions. However, the use of phosphates is to be avoided if it is at all possible to do so, since the gelatin which is recovered from a fining process in which phosphates are utilized will not itself be suitable for emulsion uses.

A gelatin solution which is treated in accordance with the present method is one which has been recovered by any of the recovery systems commonly employed, i.e., by an acid or alkaline recovery system. The gelatin solution to be fined may be concentrated to a range of 10 to 50%, with a 25% gelating solution having been found to be preferable. From an economic standpoint it will be apparent that the fining of gelatin solutions of greater concentrations will permit a greater quantity of gelatin to be fined in a single fining operation.

However the gelatin is prepared, it will contain varying amounts of impurities, including metals. The term metals as it is used in this application includes, typically, the following: calcium, barium, strontium, magnesium, beryllium, radium, lithium, iron, silver, lead, tin, chromium, mercury, copper, zinc, cadmium, titanium, uranium, gold, platinum, bismuth, etc. Other metals may also be present, but commonly they are not present in any appreciable quantities.

It will be apparent to those skilled in the art that not all gelatins will contain all these metals as impurities, and that gelatins prepared by different processes will contain greater or lesser proportions of some of these metals. For example, a gelatin which has been prepared by the so-called acid process, e.g., one which has been recovered from porkskins, will generally contain substantially less calcium than would a gelatin which has been recovered from lime splits. A gelatin which has been recovered from ossein will generally contain much less metallic impurities than would a gelatin which has been recovered, for example, from either porkskins or lime splits.

As stated hereinbefore, practice of the present invention includes the addition of a soluble aluminum salt, such as aluminum sulfate, alum or aluminum oxide, to a gelatin solution in such a manner that the pH of the resulting mixture is neutral or somewhat alkaline. Adjustment of pH is conveniently accomplished by means of a base such as ammonium hydroxide in which the cation is driven off as a gas during subsequent drying of the fined gelatin solution, thereby causing substantially no addition to the ash content of the recovered gelatin. Employment of a base such as calcium hydroxide, for example, would greatly add to the ash content of the recovered gelatin and make it undesirable for many uses. Finely divided or pulverized carbon is preferably added with the aluminum salt as a floc promoter, the carbon being subsequently removed from the gelatin solution when the floc is filtered. The carbon may be added in about one-half the amount of the aluminum salt.

It is an important feature of this invention that the aluminum salt is added to the gelatin solution in the form of a basic solution. Thus a soluble aluminum salt such as aluminum sulfate can be dissolved in water to form a 10% solution, and 28% ammonium hydroxide added until the pH of the aluminum sulfate solution is 10.0 to 10.5. The aluminum sulfate solution is then added with agitation to the gelatin solution, and the pH of the resulting solution is moderately alkaline, i.e., it has a pH of 7.0 to 9.0, preferably about 7.5.

It has already been stated that another feature of the invention is the addition of a soluble carbonate to the gelatin solution with, or more desirably before the addition of the aluminum sulfate to the solution. Among these carbonates which are suitable for use in the present process are ammonium carbonate, sodium carbonate, and potassium carbonate. Where ammonium carbonate can be used, it is the preferred carbonate, since, as is the case with ammonium hydroxide, the ammonium cation will be evolved as ammonia during the drying of the gelatin solution. There are certain metals, however, which form soluble ammonia complexes, which formation of complexes necessitates use of a carbonate such as sodium carbonate in order to precipitate these metals.

While an exhaustive study of the requirements for removing every metal from a gelatin solution has not been made, it has been determined that the following groups of metals can be removed from an aqueous solution of gelatin by means as stated.

A. Group II alkaline earth metals—Be, Mg, Ca, Sr, Ba and Ra—can be removed from aqueous solution by means of a soluble aluminum salt, a soluble carbonate and a base. Consequently, ammonium carbonate and ammonium hydroxide would be preferable in use.

B. The same reagents which will remove the Group II alkaline earth metals will also remove Li, Fe, Pb, Sn (plus 4) and C.

C. Metals in Subgroups I and II—Ag, Cu (plus one and two), Sn (plus two), Cd and Hg (plus one and two)—can be removed by a soluble aluminum salt, sodium hydroxide and sodium carbonate. Ammonium ions should be excluded from any system in which they are to be removed.

D. Transition metals—Fe, Cr, Ti, U and Au—can be removed by a soluble aluminum salt and a base. In the case of Au any base except ammonium hydroxide is suitable.

E. Platinum can be removed as the platinic hydrate by oxidation followed by flocculation with an aluminum salt and a base.

F. Bismuth can be removed by an aluminum salt, a carbonate and a base.

The amounts of soluble aluminum salt and the amounts of soluble carbonate employed in the practice of the present process must, of course, be sufficient, respectively, to form a basic aluminum hydrate in such quantities as to remove a large proportion of the impurities which can be removed by that hydrate, and to remove a large proportion of those metals which form insoluble carbonates. Preferably, the aluminum salt will be employed in a range of about 0.3 to 3.0 parts per 100 parts of dry gelatin (containing 10 to 12% by weight moisture). A most preferred quantity is 1.0 parts per 100 parts gelatin. The amount of soluble carbonate employed will vary from about 1.0 to 5.0 parts, preferably 1.5 parts per 100 parts of dry gelatin.

In the practice of the method of the invention a precipitate is formed which, on subsequent filtration, carries with it a substantial portion of the metallic and organic impurities present in the gelatin liquor after extraction of the gelatin. This precipitate is believed to be an aluminum hydrate or hydroxide, and will hereafter be referred to as basic aluminum hydrate. Where that term is used in this application, it is intended to denote that flocculent aluminum composition which is formed in a moderately alkaline, aqueous solution. The basic aluminum hydrate carries impurities down with it when it is removed from solution. This property of aluminum floc is accomplished by a mechanism which is not definitely known, but which may include coprecipitation, occlusion, adsorption, etc. Where a soluble carbonate has first been added to the gelatin solution, the basic aluminum hydrate floc will also carry down any insoluble carbonates which have been formed and which have remained in suspension in the solution. Where a soluble phosphate has previously been added to the gelatin solution, the aluminum hydrate floc will carry down with it any insoluble phosphates which have been formed and which remain unsettled as well as any emulsions which have been made accessible to capture by the floc because of the presence of the phosphates.

When phosphates are added to the gelatin solution prior to the addition of the aluminum salt or salts, it is preferable that the solution be somewhat more dilute at the time of the phosphate addition. Thus a concentration of 2 to 10% gelatin, say 4% is desirable. Such dilution prevents the precipitated phosphate from accumulating too rapidly on the filter and clogging same, which occurs when more concentrated gelatin solutions are employed.

The temperatures which are utilized during the addition of the various compositions employed in the practice of the invention will be such as to permit the maximum formation of a floc or precipitate and the optimum degree of floc accumulation without substantial hydrolysis of the gelatin subjected to the fining operation. Thus temperatures in the range of 110° to 140° F. have been found satisfactory, with a temperature of about 120° F. being preferred.

While the salts specified herein may be added directly to the gelatin solution, it has been found advantageous to put the carbonates and phosphates as well as the aluminum salts into aqueous solution prior to their addition to the gelatin solution. For example, in one embodiment ammonium carbonate is first dissolved to form a 10% aqueous solution and added slowly to the gelatin solution with agitation. When the alkaline solution of aluminum salt is added, particular care should be exercised in the addition and agitation thereof so that shearing of the basic aluminum hydrate formed does not take place.

The time necessary for the addition of each salt and the agitation of the subsequent solution will vary in accordance with the degree of agitation and the temperature of the solution. Typical time periods which have been found suitable for the addition and agitation of the carbonate are from 20 to 30 minutes. The aluminum salt solution is added with agitation during a typical period of 30 minutes to one hour. If the phosphates are added with the aluminum solution, the time of addition and agitation and floc formation and precipitation for the phosphate-aluminum salt solution is also 30 minutes to one hour.

Success in the removal of metals and other impurities from the gelatin solution will be reached in varying degrees depending on the particular conditions which are employed. In a typical run where the chromium content of the gelatin was determined prior to and after an aluminum salt fining operation, the chromium content was found to have decreased from 5 to 0.4 p.p.m. In other runs the chromium content was decreased from 8 to 1.2, from 4 to 0.8, from 3.8 to 0.5 and from 18 to 2.0 p.p.m. In another run the calcium content was reduced from 0.73% to 0.003%. The ash content was generally held or reduced to about 1%, which is considered to be a satisfactory amount.

Practice of the invention will be more readily understood by reference to the following specific examples.

*Example I*

A sample of 10% gelatin liquor was tested and found to have poor clarity and to contain chromium in the amount of 28 p.p.m. To 1000 cc. of this solution was added a solution containing 2.0 grams of aluminum sulfate, 1.0 gram of pulverized carbon and sufficient ammonium hydroxide to bring the aluminum sulfate solution to a pH of 10.2. The resulting solution, which had a pH of 8.5, was digested for 30 minutes at 120° F. with intermittent, gentle agitation. After that period of time the solution was filtered. The filtrate had good clarity and merely a trace of chromium.

*Example II*

A sample of 25% gelatin liquor was tested and found to contain 1.48% ash (fixed ash after heating for 17 hours at 580° C.) and 0.734% calcium and poor clarity. 3.0 grams of ammonium carbonate dissolved in 60 cc. of water was added to 400 cc. of the gelatin liquor and the solution digested for 20 minutes. A solution of 3.0 grams of aluminum sulfate and sufficient ammonium hydroxide to bring the solution to a pH of 10.4 was added slowly to the gelatin-carbonate solution and the whole digested for 30 minutes at 125° F. The floc which formed and included precipitated calcium carbonate was filtered. The resultant gelatin contained 0.14% ash and 0.003% calcium.

*Example III*

A liquor having a gelatin concentration of 3.5% and a chromium content of 10.0 p.p.m. was prepared. To 700 cc. of the liquor was added 0.4 g. of aluminum sulfate and 0.4 gram of an equi-part mixture of monosodium phosphate and disodium phosphate. The amount of additives corresponded to a concentration of 1.5% each of the sulfate and the phosphates based on the weight of gelatin present. The pH of the solution was adjusted to 8.0 by the addition of ammonium hydroxide and the solution was allowed to stand for 30 minutes. Filter aid in the form of Solka-Floc, a wood pulp filter aid manufactured by Brown Company, was added during this period, in which a floc appeared which may be aluminum hydrate hydroxide phosphate. The solution was filtered and the chromium content of the filtrate was found to be less than 0.5 p.p.m.

It will be understood that, while the present invention has been described with reference to specific examples thereof, various modifications and substitutions made therein by those skilled in the art will fall within the purview of the invention. It is desired, therefore, that the invention be limited only by the scope of the following, appended claims.

What is claimed is:

1. The method of fining a gelatin solution containing a minor amount of chromium as an impurity, which comprises adding a soluble carbonate selected from the group consisting of ammonium and alkali metal carbonates to said solution, further adding to said solution an alkaline solution of a soluble aluminum salt at such a pH that the pH of the resulting mixture is about 7.0 to 9.0, forming basic aluminum hydrate floc in situ in the solution, and separating the floc and said chromium impurity and insoluble carbonates carried with said floc from the fined gelatin solution.

2. The method of fining a gelatin solution containing a minor amount of chromium as an impurity, which comprises adding to said solution a soluble phosphate selected from the group consisting of an alkali metal and ammonium phosphates, orthophosphates and pyrophosphates, further adding to said solution an alkaline solution of a soluble aluminum salt at such a pH that the pH of the resulting mixture is about 7.0 to 9.0, forming basic aluminum hydrate floc and an insoluble phosphate in situ in said solution, and separating the floc and said chromium impurity and insoluble phosphates formed in said solution and carried with said floc from the fined gelatin solution.

3. The method of fining a gelatin solution containing a minor amount of chromium as an impurity, which comprises adding to said solution an equimolar mixture of monosodium phosphate and disodium phosphate, said mixture being soluble in said solution, further adding to said solution an alkaline solution of a soluble aluminum salt at such a pH that the pH of the resulting mixture is about 7.0 to 9.0, forming basic aluminum hydrate floc and an insoluble phosphate in situ in said solution and separating the floc and said chromium impurity and insoluble phosphates formed in said solution and carried with said floc from the fined gelatin solution.

4. The method of fining a gelatin solution containing a minor amount of chromium as an impurity, which comprises adding to said solution a soluble carbonate selected from the group consisting of ammonium and alkali metal carbonates and a soluble phosphate selected from the group consisting of ammonium and alkali metal phosphates, orthophosphates and pyrophosphates, agitating said solution to put said carbonate and said phosphate into solution, adding to said solution an alkaline solution of a soluble aluminum salt selected from the group consisting of aluminum sulfate, alum and aluminum hydroxide at such pH that the pH of the resulting mixture is about 7.0 to 9.0 and the solution is at a temperature of about 110° to 140° F., forming aluminum hydrate floc and an insoluble phosphate and carbonate in situ in said solution, and separating the floc and said chromium impurity and insoluble carbonates and phosphates formed in said solution and carried with said floc from the fined gelatin solution.

References Cited by the Examiner
UNITED STATES PATENTS 2,166,297   7/1939   Jacquet _____ 260—118

FOREIGN PATENTS 709,331   7/1941   Germany

OTHER REFERENCES

Lollar: "Leather Chemists Association" (1940), vol. 35.

Thorne et al.: Inorganic Chemistry (1943).

WILLIAM H. SHORT, *Primary Examiner.*

L. ZITVER, J. R. LIBERMAN, *Examiners.*